(12) United States Patent
Lippert

(10) Patent No.: US 10,951,458 B2
(45) Date of Patent: *Mar. 16, 2021

(54) COMPUTER CLUSTER ARRANGEMENT FOR PROCESSING A COMPUTATION TASK AND METHOD FOR OPERATION THEREOF

(71) Applicant: ParTec Cluster Competence Center GmbH, Munich (DE)

(72) Inventor: Thomas Lippert, Aschaffenburg (DE)

(73) Assignee: ParTec Cluster Competence Center GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/191,973

(22) Filed: Nov. 15, 2018

(65) Prior Publication Data

US 2019/0089574 A1    Mar. 21, 2019

Related U.S. Application Data

(63) Continuation of application No. 13/861,429, filed on Apr. 12, 2013, now Pat. No. 10,142,156, which is a
(Continued)

(30) Foreign Application Priority Data

Oct. 13, 2010   (EP) .................................... 10187436

(51) Int. Cl.
*G06F 9/50*      (2006.01)
*H04L 29/08*   (2006.01)

(52) U.S. Cl.
CPC ...... *H04L 29/08081* (2013.01); *G06F 9/5061* (2013.01); *H04L 67/00* (2013.01); *G06F 2209/509* (2013.01)

(58) Field of Classification Search
CPC ................. H04L 29/06; H04L 29/0845; H04L 29/08468; G06F 9/4843; G06F 9/505; G06F 9/4806; G06F 9/5072; G06F 9/5027
See application file for complete search history.

(56) References Cited

U.S. PATENT DOCUMENTS 6,922,832 B2    7/2005   Barnett et al.
7,051,188 B1    5/2006   Kubala et al.
(Continued)

FOREIGN PATENT DOCUMENTS

| JP | H07-044504 A  | 2/1995 |
| JP | 2002-084302 A | 3/2002 |
| JP | 2010-092483 A | 4/2010 |

OTHER PUBLICATIONS

International Search Report and Written Opinion dated Feb. 10, 2012 in corresponding PCT Application No. PCT/EP2011/067888.
(Continued)

*Primary Examiner* — Oanh Duong
(74) *Attorney, Agent, or Firm* — Marshall, Gerstein & Borun LLP

(57) ABSTRACT

The present invention is directed to a computer cluster arrangement and a method for operation of the introduced computer cluster arrangement. The computer cluster arrangement comprises computation nodes CN, which dynamically outsource specific computation tasks to boosters B. Therefore, an assignment technique of boosters B to computation nodes CN is introduced. The assignment takes dynamically place at runtime. The present invention finds application in high performance cluster technology.

15 Claims, 9 Drawing Sheets

Related U.S. Application Data continuation of application No. PCT/EP2011/067888, filed on Oct. 13, 2011.

(56) References Cited

U.S. PATENT DOCUMENTS

| | | | |
|---|---|---|---|
| 7,093,147 | B2 | 8/2006 | Farkas et al. |
| 7,137,040 | B2 | 11/2006 | Bae et al. |
| 7,406,692 | B2 | 7/2008 | Halpern et al. |
| 7,490,223 | B2 | 2/2009 | Favor et al. |
| 8,402,080 | B2 | 3/2013 | Tannenbaum et al. |
| 8,875,152 | B2 | 10/2014 | Devadhar et al. |
| 10,142,156 | B2 * | 11/2018 | Lippert ............ G06F 9/5061 |
| 2004/0098447 | A1 | 5/2004 | Verbeke et al. |
| 2004/0257370 | A1 | 12/2004 | Lippincott et al. |
| 2005/0097300 | A1 | 5/2005 | Gildea et al. |
| 2006/0095807 | A1 | 5/2006 | Grochowski et al. |
| 2006/0224706 | A1 | 10/2006 | Kudo et al. |
| 2007/0283358 | A1 | 12/2007 | Kasahara et al. |
| 2009/0213127 | A1 | 8/2009 | Krishnamurthy et al. |
| 2009/0217275 | A1 * | 8/2009 | Krishnamurthy ..... G06F 9/5077 718/102 |
| 2010/0058036 | A1 | 3/2010 | Degenaro et al. |
| 2010/0122199 | A1 | 5/2010 | Darrington et al. |
| 2010/0153345 | A1 | 6/2010 | Ginkel et al. |
| 2010/0185719 | A1 | 7/2010 | Howard |
| 2011/0161972 | A1 | 6/2011 | Dillenberger et al. |
| 2012/0054770 | A1 | 3/2012 | Krishnamurthy et al. |

OTHER PUBLICATIONS

English Translation of European Patent Office Statement of Grounds of Opposition to EPO patent No. EP 2 628 080 B1, dated Mar. 11, 2020.
S. Pakin et al: "The reverse-acceleration model for programming petascale hybrid systems", IBM Journal of Research and Development., vol. 53, No. 5, Sep. 1, 2009 (Sep. 1, 2009), pp. 8:1-8:15, XP055595871, US ISSN: 0018-8646, DOI: 10.1147/JRD.2009.5429074.
English Translation of Japanese Office Action for Application No. 2018-208953, dated Sep. 13, 2019.

* cited by examiner

COMPUTER CLUSTER ARRANGEMENT FOR PROCESSING A COMPUTATION TASK AND METHOD FOR OPERATION THEREOF

CROSS-REFERENCE TO RELATED APPLICATIONS

This application is a continuation of U.S. patent application Ser. No. 13/861,429, filed Apr. 12, 2013, which is a continuation of PCT Application No. PCT/EP2011/067888, filed Oct. 13, 2011, which was published in the English language on Apr. 19, 2012 as PCT Publication No. WO 2012/049247. The PCT Application claims priority to EP Application No. 10187436.0, filed Oct. 13, 2010. These documents are hereby incorporated herein by reference in their entireties.

FIELD

The present invention is directed toward a computer cluster arrangement. In particular, it relates to a computer cluster arrangement with improved resource management as regards the application of computing nodes for processing scalable computation tasks as well as complex computation tasks. It is especially directed toward a computer cluster arrangement for processing a computation task and a method for operating the computer cluster arrangement. The computer cluster arrangement in accordance with the present invention makes use of acceleration functionality, which assist the computing nodes to accomplish a given computation task. The present invention is furthermore directed toward a computer program product being configured for accomplishing the method as well as a computer readable medium for storing the computer program product.

BACKGROUND

Known in the art are computer cluster arrangements comprising computing nodes including at least one processor as well as accelerators being tightly coupled to the computing nodes for outsourcing computations of high resource requirements. A tight coupling of accelerators to computing nodes results in a static assignment and leads to over- or under-subscription of accelerators. This may lead to a lack of resources or may lead to an excessive supply of resources. Such a static assignment of accelerators to computing nodes does furthermore not provide fault tolerance in case of accelerator failures.

The publication "rCUDA: reducing the number of GPU-based accelerators in high performance clusters" by Jose Duato, Rafael Mayo et al., International Conference on High Performance Computing and Simulation (HPCS), Issue Date: Jun. 28, 2010-Jul. 2, 2010, on pages 224-231, describes a frame work that enables remote GPU acceleration in high performance clusters, thus allowing a reduction in the number of accelerators installed on the cluster. This may lead to energy, acquisition, maintenance and space savings.

The publication "A package for open CL based heterogeneous computing on clusters with many GPU devices" by Amnon Barak, et al. of the Department of Computer Science from Hebrew University of Jerusalem describes a package for running OpenMP, C++ an unmodified OpenCL applications on clusters with many GPU devices. Furthermore, an implementation of the OpenCL specifications and extensions of the OpenMP API that allow applications on one hosting-node to transparently utilize cluster-wide devices is provided.

FIG. 1 shows a computer cluster arrangement according to the state of the art. The computer cluster arrangement comprises several computations nodes CN, which are interconnected and jointly compute a computation task. Each computation node CN is tightly coupled with an accelerator Acc. As can be seen in FIG. 1 a computation node CN comprises an accelerator unit ACC which is virtually integrated on the computation node CN along with a microprocessor, for instance a central processing unit CPU. As introduced above, the fixed coupling of accelerators Acc to computation nodes CN leads to an over- or under subscription of accelerators Acc depending on the computation task. Furthermore, no fault tolerance is provided in case of failure of one of the accelerators Acc. In the known computer cluster arrangement according to FIG. 1 computing nodes CN communicate with each other over an infrastructure, wherein accelerators Acc do not exchange information directly, but require a computation node CN interfacing the infrastructure IN for data exchange.

SUMMARY

Hence, it is an object of the present invention to provide a computer cluster arrangement, which allows communication flexibility as regards data exchange between accelerator and computation nodes as well as direct access of computation nodes to any and each of the accelerators.

Furthermore, it is an object of the present invention to provide a dynamic coupling of accelerators to computation nodes at runtime.

These objects are solved by a computer cluster arrangement with features according to PCT patent claim 1 (presented below).

Accordingly, a computer cluster arrangement for processing a computation task is provided, the computer cluster arrangement comprising: a plurality of computation nodes, each of which interfacing a communication infrastructure, at least two of which being arranged to jointly compute at least a first part of the computation task; at least one booster being arranged to compute at least a second part of the computation task, each booster interfacing the communication infrastructure; and a resource manager being arranged to assign at least one booster to at least one of the plurality of computation nodes for computation of the second part of the computation task, the assignment being accomplished as a function of a predetermined assignment metric.

In this computer cluster arrangement acceleration functionality is being provided by independent boosters. The described computer cluster arrangement allows a loose coupling of those boosters to computation nodes, which may also be referred to as compute nodes. Hence, a sharing of accelerators, here in form of boosters, by computation nodes is feasible. For an assignment of a booster to a computation node a resource manager, in form of a resource manager module or resource manager node, may be provided. The resource manager may establish a static assignment at start of a processing of a computation task. Alternatively or additionally it may establish a dynamic assignment at runtime, which means during processing of the computation task.

The resource manager is arranged to provide assignment information to the computation nodes for outsourcing parts of the computation tasks from at least one computation node to at least one booster. The resource manager may be implemented as a specific hardware unit, a virtual unit or be compound of any of them. Especially the resource manager may be formed by any-one of: a microprocessor, a hardware component, a virtualized hardware component or a daemon. Furthermore parts of the resource manager may be distributed over the system and communicate via a communication infrastructure.

Communication between boosters is accomplished through a network protocol. Hence, booster allocation is performed as a function of application needs, which means in dependency of processing a specific computation task. Fault tolerance in case of booster failure is provided as well as scalability is fostered. Scalability is made possible by support of incremental system development, as boosters are provided independently of computation nodes. Hence, the number of computation nodes and the number of provided boosters may differ. Thus, a maximum flexibility in providing hardware resources is established. Furthermore, all computation nodes do share the same growth capacity.

A computation task may be defined by means of an algorithm, a source code, a binary code and may be furthermore be compound of any of them. A computation task may for instance be a simulation, which is to be computed by the computer cluster arrangement. Furthermore, the computation task may comprise several sub problems, also referred to as sub tasks, which in their entirety describe the overall computation task. It is possible to divide the computation task into several parts, for instance at least a first part of the computation task and at least a second part of the computation task. It is also possible for the computer cluster arrangement to solve the parts of the computation task in parallel or in succession. Each computation node interfaces a communication infrastructure, also referred to as interconnect. Analogously, each booster interfaces the communication infrastructure. Hence, the computation nodes as well as the boosters interact by means of the communication infrastructure. Therefore, each computation node communicates with each booster over the communication infrastructure, without the necessity to involve a further communication node while exchanging data from a computation node to a booster. Thus, a dynamic assignment of computation nodes to boosters is established, wherein computation nodes process at least a part of the computation task and are not required for passing through of information from one computation node to one booster. Therefore, it is possible to directly couple boosters to the communication infrastructure without the necessity of an intermediate computation node as it is typically implemented in the state of the art.

For accomplishing the assignment between boosters and computation nodes a specific set of rules is required. Therefore, an assignment metric is provided, which serves as a basis for the decision which booster is coupled with which computation node. The assignment metric may be managed by a resource manager. Managing the assignment metric refers to establishing and updating rules naming at least one booster, which is assigned to at least one further named computation node. Hence, it is possible to update the assignment metric at runtime. Such assignment rules may be created as a function of a load balancing, which detects workload of the computer cluster arrangement, especially of the boosters. Furthermore, it is possible to detect computing capacities of boosters and furthermore detect computation task requirements and assign a selected booster, which provides the required capacities to the computation node. For determining an initial assignment of boosters to computation nodes, the assignment metric is predetermined but may be altered at runtime. Hence, static assignment is provided at start of the processing of computation task and dynamic assignment is provided at runtime.

In an embodiment of the present invention the determined assignment metric is formed according to at least one of group of metric specification techniques, the group comprising: a temporal logic, an assignment matrix, an assignment table, a probability function and a cost function. Hence, temporal dependencies may be considered for assigning the boosters. It may be the case, that a temporal order is defined on the boosters, which makes sure that a specific booster is always assigned to a computation node in case a further booster failed to solve at least a part of the computation task. Hence, a hierarchy between boosters can be considered for their assignment. An assignment metric may name an identification of a computation node and may furthermore define identifications of compatible boosters which can be assigned. A probability function may for instance describe that in case a specific booster failed to compute a certain computation task a further booster may solve the same computation task at a specific probability. Furthermore cost functions may be applied for evaluation of required resource capacities and furthermore for evaluation of provided computation capacities of boosters.

Hence, computation tasks of certain requirements can be forwarded to appropriate boosters.

A computation history, also referred to as computation log record, may also be applied for dynamic assignment. Hence, computation tasks can be empirically evaluated by computation on at least one first booster and recording response times and furthermore by processing the same computation task on at least one further booster and recording response times. Hence, capacities of boosters can be recorded, empirically evaluated and therefore be assigned to computation nodes as a function of required capacities and their provided capacities. Specific computation tasks may comprise priority information, which indicates how urgently this specific computation task has to be computed. It may also be the case that specific computation nodes provide a priority, which indicates how urgent a processing of a computation task, or at least a part of a computation task, is compared to other parts of computation tasks being originated from other computation nodes. Hence, it is possible to provide priority information as regards single parts of the computation task as well as priority information referring to computation nodes. Once a booster is assigned to a computation node, the booster processes specific parts of a computation task. This may be accomplished by a remote procedure call, a parameter handover or data transmission. The complexity of the part of the computation task may be evaluated as a function of a parameter handover. In case a parameter contains a matrix, the complexity of the parameter handover can be evaluated by the number of dimensions of the matrix.

For interfacing the communication infrastructure an interfacing unit may be provided, which is arranged between one computation node and the communication infrastructure. A further interfacing unit being different from the first interfacing unit, may be arrange between the booster and the communication infrastructure. The interfacing unit can be different form the computation node and is also different from the booster. The interfacing unit merely provides network functionality, without being arranged to process parts of the computation task. The interfacing unit merely provides functionality as regards the administration and communication issues of the computation tasks. It may for example provide functionality as regards routing and transmission of data referring to the computation task. Furthermore, acceleration can also be performed reversely by outsourcing at least a part of the computation task from at least one booster to at least one computation node. Hence, control and information flow is reversed as regards the above introduced aspects of the invention.

According to an aspect of the present invention, the predetermined assignment may be formed according to at least one group of matrix specification techniques, the group comprising: a temporal logic, an assignment matrix, an assignment table, a probability function and a cost function. This may provide the advantage that the predetermined assignment metric may be formed under usage of a formal or semiformal model or data type.

According to a further aspect of the present invention, the predetermined assignment metric is specified as a function of at least one of a group of assignment parameters, the group comprising: resource information, cost information, complexity information, scalability information, a computation log record, compiler information, priority information and a time stamp. This may provide the advantage that the assignment may be performed dynamically at runtime under consideration of different runtime parameters and in response to specific computation task characteristics.

According to a further aspect of the present invention, the assignment of at least one booster to one of the plurality of computation nodes triggers at least one of a group of signals, the group comprising: a remote procedure call, a parameter handover and a data transmission. This may provide the advantage that at least a part of the computation tasks can be forwarded from one computation node to at least one booster.

According to a further aspect of the present invention, each computation node and each booster interfaces the communication infrastructure respectively via an interfacing unit. This may provide the advantage that data can be communicated via the communication infrastructure without the necessity of an intermediate computation node. Hence, it is not required to couple a booster with a computation node directly but a dynamic assignment is reached.

According to a further aspect of the present invention, the interfacing unit comprises at least one group of components, the group comprising: a virtual interface, a stub, a socket, a network controller and a network device. This may provide the advantage that the computation nodes as well as the boosters can also be virtually connected to the communication and infrastructure. Furthermore existing communication infrastructures can be easily accessed. According to a further aspect of the present invention, communication and infrastructure comprises at least one of a group of components, the group comprising: a bus, a communication link, a switching unit, a router and a high speed network. This may provide the advantage that existing communication infrastructures can be used and new communication infrastructures can be created by commonly available network devices.

According to a further aspect of the present invention, each computation node comprises at least one of a group of components, the group comprising: a multi core processor, a cluster, a computer, a workstation and a multipurpose processor. This may provide the advantage that the computation nodes are highly scalable.

According to a further aspect of the present invention, the at least one booster comprises at least one group of components, the group comprising: a many-core-processor, a scalar processor, a co-processor, a graphical processing unit, a cluster of many-core-processors and a monolithic processor. This may provide the advantage that the boosters are implemented to process specific problems at high speed.

Computation nodes typically apply processors comprising an extensive control unit as several computation tasks have to be processed simultaneously. Processors being applied in boosters typically comprise an extensive arithmetic logic unit and a simple control structure when being compared to computation nodes processors. For instance SIMD, also refer to as single instruction multiple data computers, may find application in boosters. Hence, processors being applied in computation nodes differ in their processor design compared to processors being applied in boosters.

According to a further aspect of the present invention, the resource manager is arranged to update said predetermined assignment metric during computation of at least a part of said computation task. This may provide the advantage that the assignment of boosters to computation nodes can be performed dynamically at runtime.

The object is also solved by a method for operating a computer cluster arrangement according to the features of PCT patent claim 11 (presented below).

Accordingly a method for operating a computer cluster arrangement is provided for processing a computation task, the method comprising: computing at least a first part of the computation task by at least two of the plurality of computation nodes, each computation node interfacing a communication infrastructure; computing at least a second part of the computation task by at least one booster, each booster interfacing the communication infrastructure; and assigning at least one booster to one of the plurality of computation nodes by a resource manager for computation of the second part of the computation task, the assignment being accomplished as a function of a predetermined assignment metric.

Furthermore, a computer program being configured for accomplishing the introduced method as well as a computer readable medium for storing the computer program product are provided.

Preferred embodiments of the invention are defined in the following claims of the Published PCT Application:

1. A computer cluster arrangement for processing a computation task, comprising: a plurality of computation nodes (CN), each of which interfacing a communication infrastructure (IN), at least two of which being arranged to jointly compute at least a first part of said computation task; at least one booster (B) being arranged to compute at least a second part of said computation task, each booster (B) interfacing said communication infrastructure (IN); and a resource manager (RM) being arranged to assign at least one booster (B) to at least one of said plurality of computation nodes (CN) for computation of said second part of said computation task, the assignment being accomplished as a function of a predetermined assignment metric.

2. The computer cluster arrangement according to claim 1, wherein said predetermined assignment metric is formed according to at least one of a group of metric specification techniques, said group comprising: a temporal logic, an assignment matrix, an assignment table, a probability function and a cost function.

3. The computer cluster arrangement according to one of the preceding claims, wherein said predetermined assignment metric is specified as a function of at least one of a group of assignment parameters, said group comprising: resource information, cost information, complexity information, scalability information, a computation log record, compiler information, priority information and a time stamp.

4. The computer cluster arrangement according to one of the preceding claims, wherein said assignment of at least one booster (B) to one of said plurality of computation nodes (CN) triggers at least one of a group of signals, said group comprising: a remote procedure call, a parameter handover, a data transmission.

5. The computer cluster arrangement according to one of the preceding claims, wherein each computation node (CN) and each booster (B) interface said communication infrastructure (IN) respectively via an interfacing unit (IU1; IU2).

6. The computer cluster arrangement according to claim 5, wherein said interfacing unit (IU1; IU2) comprises at least one of a group of components, said group comprising: a virtual interface, a stub, a socket, a network controller and a network device.

7. The computer cluster arrangement according to one of the preceding claims, wherein said communication infrastructure (IN) comprises at least one of a group of components, said group comprising: a bus, a communication link, a switching unit, a router and a high speed network.

8. The computer cluster arrangement according to one of the preceding claims, wherein each computation node (CN) comprises at least one of a group of components, said group comprising: a multi-core processor, a cluster, a computer, a workstation and a multi-purpose processor.

9. The computer cluster arrangement according to one of the preceding claims, wherein said at least one booster (B) comprises at least one of a group of components, said group comprising: a many-core processor, a scalar processor, a co-processor, a graphical processing unit, a cluster of many-core processors and a monolithic processor.

10. The computer cluster arrangement according to one of the preceding claims, wherein said resource manager (RM) is arranged to update said predetermined assignment metric during computation of at least a part of said computation task.

11. A method for operating a computer cluster arrangement for processing a computation task, especially a computer cluster according to at least one of claims 1 to 10, comprising: computing (100) at least a first part of said computation task by at least two of said plurality of computation nodes (CN), each computation node (CN) interfacing a communication infrastructure (IN); computing (101) at least a second part of said computation task by at least one booster (B), each booster (B) interfacing said communication infrastructure (IN); and assigning (102) at least one booster (B) to one of said plurality of computation nodes (CN) by a resource manager (RM), for computation of said second part of said computation task, said assignment being accomplished as a function of a predetermined assignment metric.

12. A computer program product being configured for accomplishing the method according to claim 11.

13. A computer readable medium for storing said computer program product according to claim 12.

BRIEF DESCRIPTION OF THE DRAWINGS

The invention will now be described merely by way of illustration with reference to the accompanying drawings.

DETAILED DESCRIPTION

Figure 1:
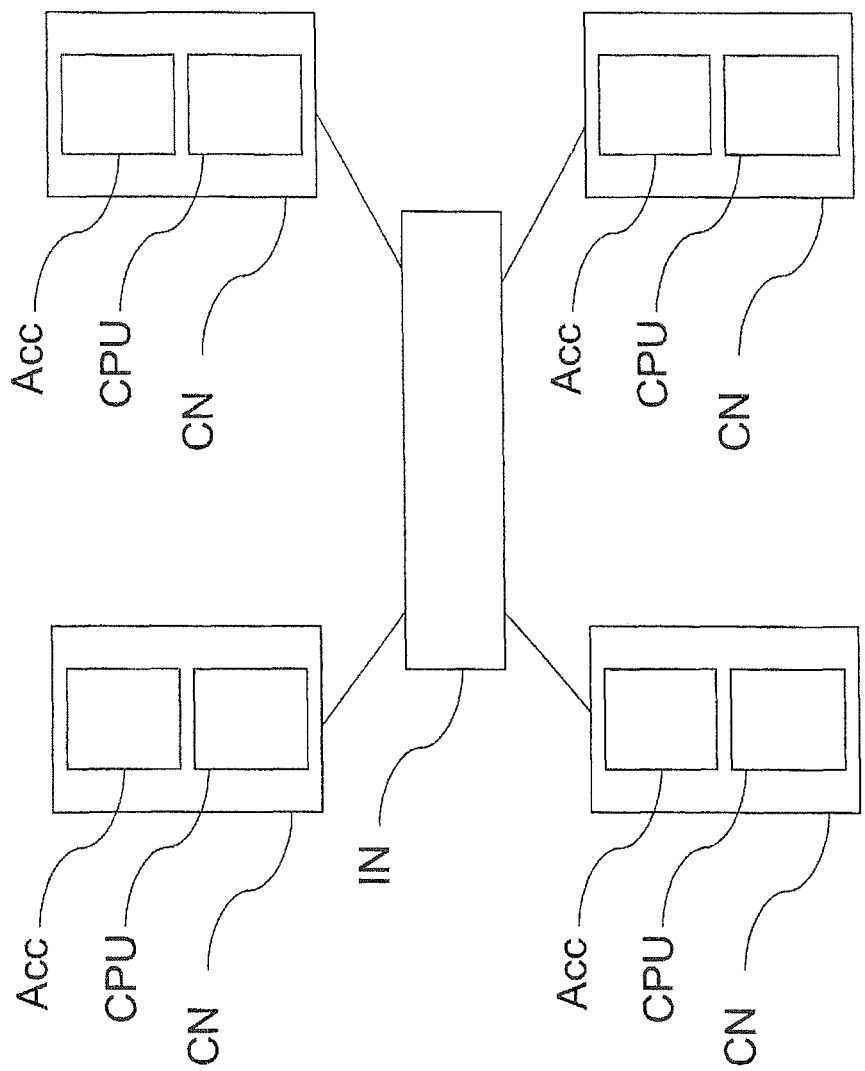
FIG. 1 shows a computer cluster arrangement according to the state of the art.
Figure 2:
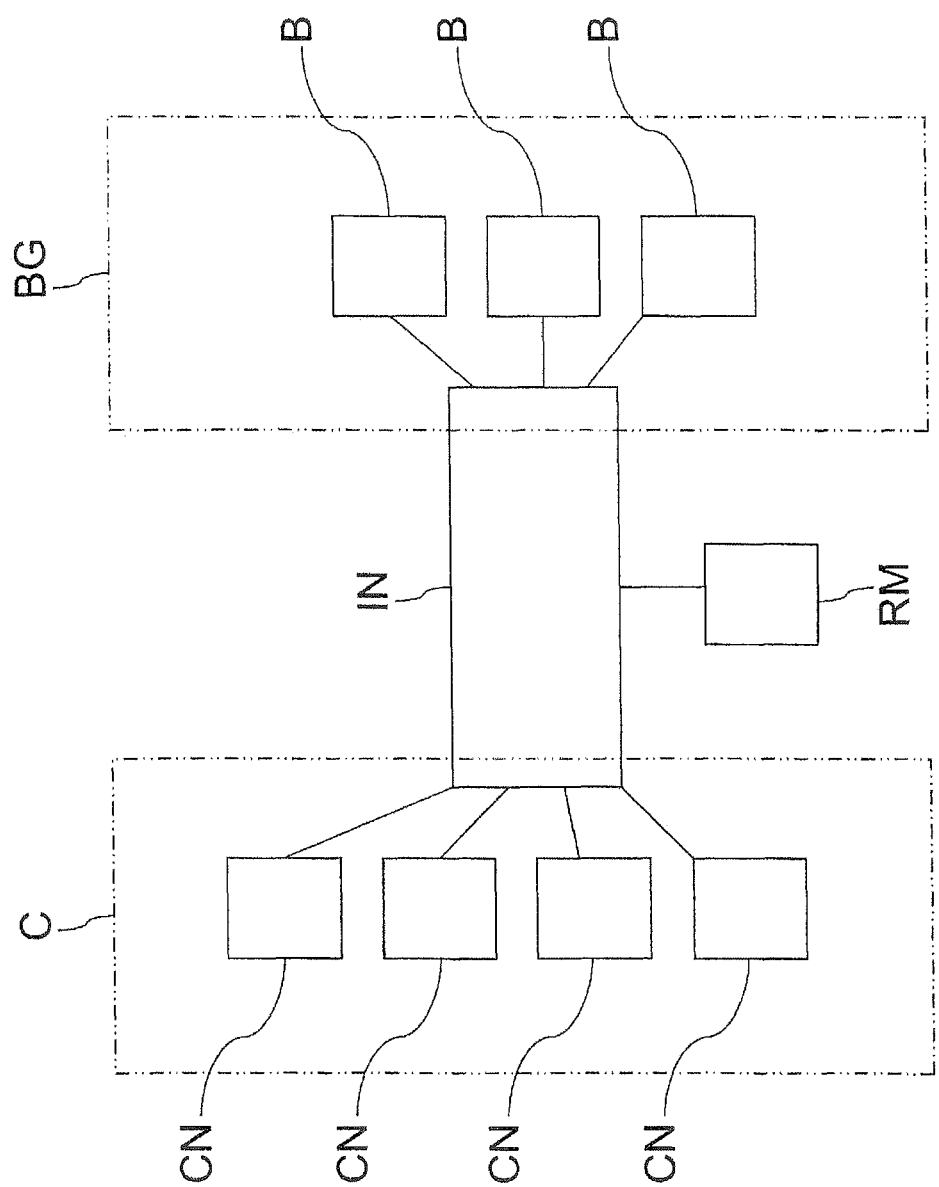
FIG. 2 shows a schematic illustration of a computer cluster arrangement according to an aspect of the present invention.

In the following same notions will be denoted with the same reference signs, if not indicated otherwise. FIG. 2 shows a computer cluster arrangement comprising a cluster C as well as a booster group BG. The cluster comprises in the present embodiment four computation nodes, also referred as CN, as well as three boosters, also referred to as B. A flexible coupling of boosters to computation nodes is established by a communication infrastructure IN, such as a so called interconnect. This kind of communication infrastructure IN can be implemented for instance by using InfiniBand. Hence, each of the boosters B can be shared by any of the computation nodes CN. Furthermore a virtualization on cluster level can be accomplished. Each booster, or at least a part of the boosters, can be virtualized and made available to the computation nodes virtually.

In the present embodiment computation tasks are processed by at least one of the computation nodes CN and at least a part of the computation tasks may be forwarded to at least one of the boosters B. The boosters B are arranged to compute specific problems and provide specific processing power. Hence, problems can be outsourced from one of the computation nodes CN to the boosters B, be computed by the booster and the result may be delivered back to the computation node. The assignment of boosters ESB to computation nodes CN can be accomplished by a resource manager, also referred to as RM. The resource manager initializes a first assignment and further on establishes a dynamic assignment of boosters B to computation nodes CN.

For communication between boosters and computation nodes an application programming interface, also referred to as API, can be provided. The boosters B may be controlled transparently by the computation nodes through the respective API function calls. The API abstracts and enhances actual native programming models of the boosters.

Furthermore the API may provide means for fault tolerance in case of a booster failure. A communication protocol involved in API calls may be layered on top of a communication layer. In the following a short description of a set of API calls according to an aspect of the present invention is provided, in which the parameter "accelerator" may specify the addressed booster:

aanInit (accelerator)—Initializes the booster before use.

aanFinalize (accelerator)—Releases bookkeeping information on the booster after use.

aanMemAlloc (address, size, accelerator)—Allocates size Bytes of memory on the referenced booster. Returns address of allocated device memory.

aanMemFree (address, accelerator)—Releases the memory starting at address on the referenced booster.

aanMemCpy (dst, src, size, direction, accelerator)—Copies size Bytes from src to dst memory address. The direction of the copy operation can be: (i) booster to host, (ii) host to booster.

aanKernelCreate (file_name, funct_name, kernel, accelerator)—Creates a kernel defined by the name of the file (file_name) and the name of the function (funct_name) for execution on the referenced booster. Returns handle to kernel.

aanKernelSetArg (kernel, index, size, align, value)—Defines argument for kernel execution by its index in the argument list, size, alignment requirement (align), and value.

aanKernelRun (kernel, grid_dim, block dim)—Starts kernel execution on the booster associated with kernel in a previous call to acKernelCreate( ) The number of threads is determined by number of threads per block (block_dim) and number of blocks in the grid (grid_dim).

aanKernelFree (kernel)—Releases the resources associated with kernel.

Figure 3:
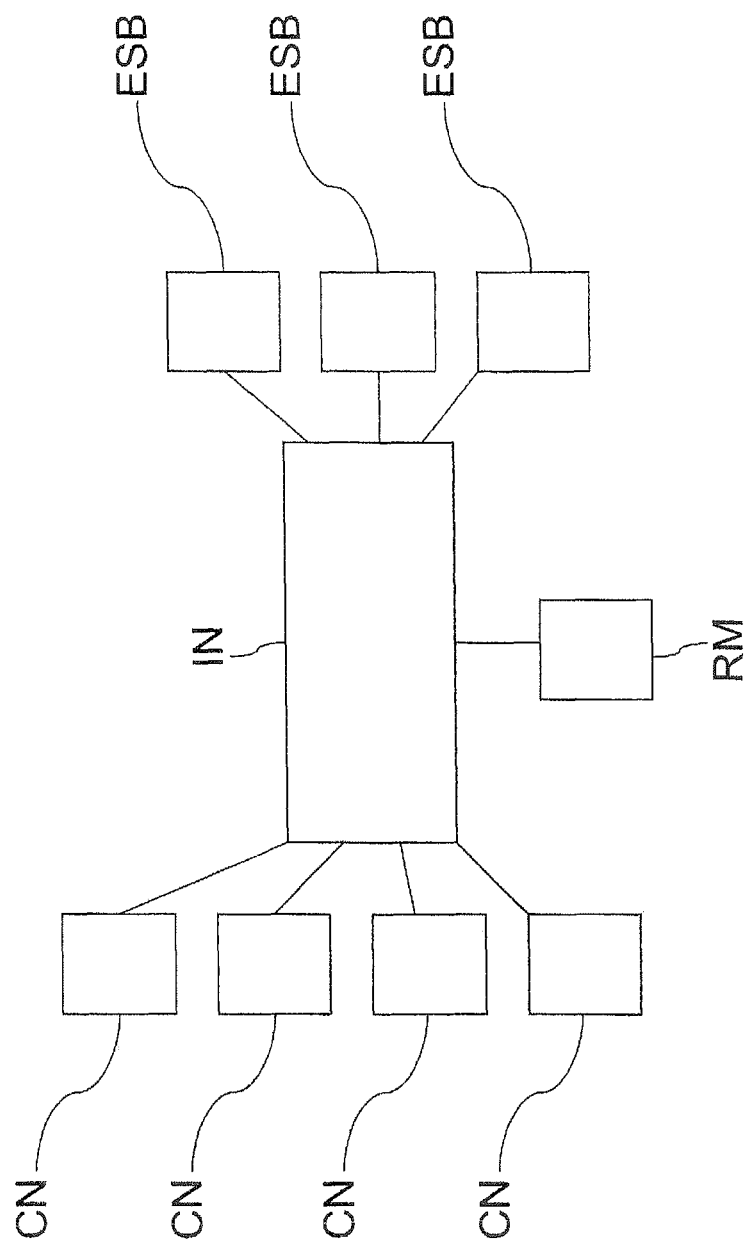
FIG. 3 shows a schematic illustration of a computer cluster arrangement according to a further aspect of the present invention.

FIG. 3 shows a further cluster arrangement according to an aspect of the present invention. The depicted computer cluster arrangement is arranged to compute scientific computation tasks, especially in the context of high performance cluster technology. A closer analysis of the characteristics of the portfolio of scientific high performance cluster application codes reveals that many codes with Exascale needs include, on the one hand, code blocks that are well suited for Exascaling, and, on the other hand, such code blocks that are too complex to be so scalable. In the following, the distinction between highly scalable and complex is made on the level of code blocks, and we introduce the notions Exascale Code Blocks (ECB) and complex Code Blocks (CCB). Obviously, there is no purely highly scalable code, and there is no strictly complex code as well. Each code has highly scalable and less scalable complex elements. In fact, there is a continuum between both extremes. Interestingly, many less scalable elements of a code do not require high scalability but instead require large local memory. It is also evident that all-to-all communication elements have a high advantage under smaller parallelism.

For such problems, where a decent balance between ECBs and CCBs is given in terms of the relative amounts of memory (i.e., the degrees of freedom handled in of the relative amounts of memory, i.e., the degrees of freedom handled in of ECB vs. the CCB), execution times and data to be exchanged, it suggests itself to adapt to this situation by means of a specific architectural solution. The solution consisting of a traditional cluster computer approach along with an Exascale booster with tightly connected boosters and being connected with a cluster through the cluster's network. This dualistic approach has the potential to widen the anticipated narrow application field of pure Exascale systems substantially.

A coarse-grained architectural model emerges, where the highly scalable parts or ECBs of an application code are executed on a parallel many-core architecture, which is accessed dynamically, while the CCBs are executed on a traditional cluster system suitable dimensioned, including the connectivity along with a refined dynamical resource allocation system.

Clusters at Exascale require virtualization elements in order to guarantee resilience and reliability. While local accelerators, in principle, allow for a simple view on the entire system and in particular can utilize the extremely high local bandwidth, they are absolutely static hardware elements, well suited for farming or master-slave parallelization. Hence, it would be difficult to include them in a virtualization software layer. In addition, there would be no fault tolerance if an accelerator fails, and there was no tolerance for over or under subscription.

The cluster's computation nodes CN are internally coupled by a standard cluster interconnect, e.g., Mellanox InfiniBand. This network is extended to include the booster (ESB) as well. In the figure we have drawn three such boosters. The ESBs each consist of a multitude of many-core accelerators connected by a specific fast low-latency network. This connection of the CNs with the ESBs is very flexible. A sharing of accelerator capability between computation nodes becomes possible. The virtualization on the cluster level is not hampered by the model and the full ESB parallelism can be exploited. The ESB-to-CN assignment proceeds via a dynamical resource manager RM. A static assignment at start-time can be made dynamic at run-time. All CN-ESB communication proceeds via the cluster network protocol. The intra-AC communication will require new solutions. The ESB allocation can follow the application needs and fault tolerance is guaranteed in case of accelerator failures while all computation nodes share the same growth capacity.

As compute element of the booster Intel's many-core processor Knight's Corner (KC) may be applied. The KC-chip will consist of more than 50 cores and is expected to provide a DP compute capacity of over 1 Teraflop/s per chip. With 10,000 elements a total performance of 10 Petaflop/s would be in reach. The predecessor of KC, the Knight's Ferry processor (KF) will be used in the project to create a PCIe-based pilot system to study the cluster-booster (CN-ESB) concept.

As the compute speed of KF exceeds current commodity processors by a factor of about 10, the intra-ESB communication system has to be dimensioned accordingly. The ESB's communication system requires at least 1 Terabit/s per card (duplex). The communication system EXTOLL may be used as an implementation of a bus system, which provides a communication rate of 1.44 Terabits per card. It realizes a 3d topology providing 6 links per card. Concerning its simplicity, this topology appears to be applicable for a booster based on many-core accelerators. Even with two directions reserved for cut-through routing, EXTOLL can saturate the PCI Express performance as far as the data rate is concerned. The latency can reach 0.3 $\mu$s, when based on an ASIC realization. Currently, EXTOLL is realized by means of FPGAs.

Figure 4:
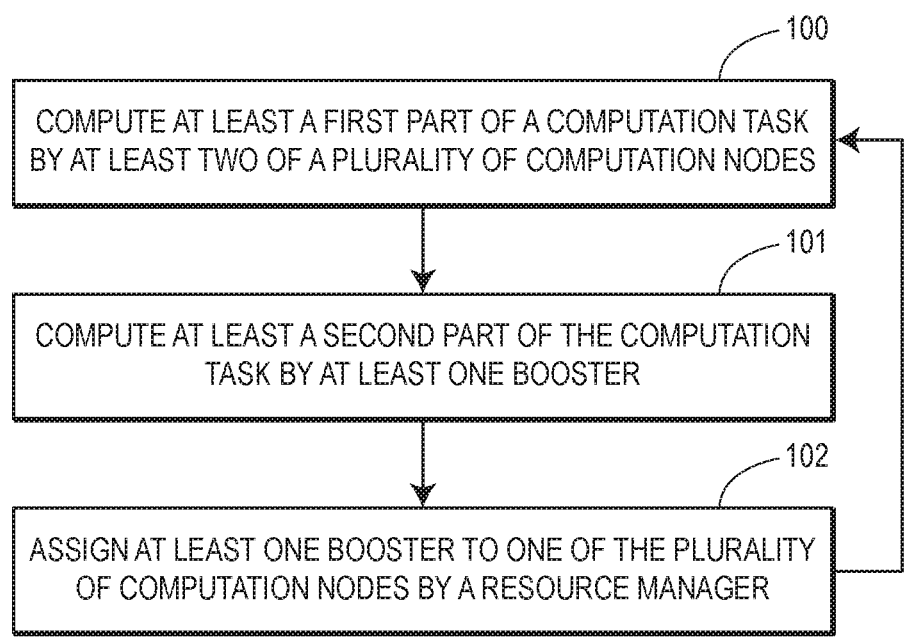
FIG. 4 shows a schematic illustration of a method for operating a computer cluster arrangement according to an aspect of the present invention.

FIG. 4 shows a flow diagram for illustrating an aspect of a method for operating a computer cluster arrangement according to the present invention. In a first step 100 at least the first part of a computation task is computed by at least two of the plurality of computation nodes CN, each computation node CN interfacing a communication infrastructure IN. Furthermore, computing of at least a second part of the computation task in step 101 by at least one booster B is performed, each booster B interfacing the communication infrastructure IN. Further, assigning at least one booster B to one of the plurality of computation nodes CN in step 102 by a resource manager RM, for computation of the second part of the computation task is performed. As the right arrow in FIG. 4 indicates the control flow may point back to step 100.

After assigning at least one booster B to at least one of the plurality of computation nodes CN in step 102 the assignment can be communicated to a computation node CN, which uses the transmitted assignment in further outsourcing steps. Hence, computing at least a second part of the computation task is performed in step 101 as a function of the assignment step 102.

Figure 5:
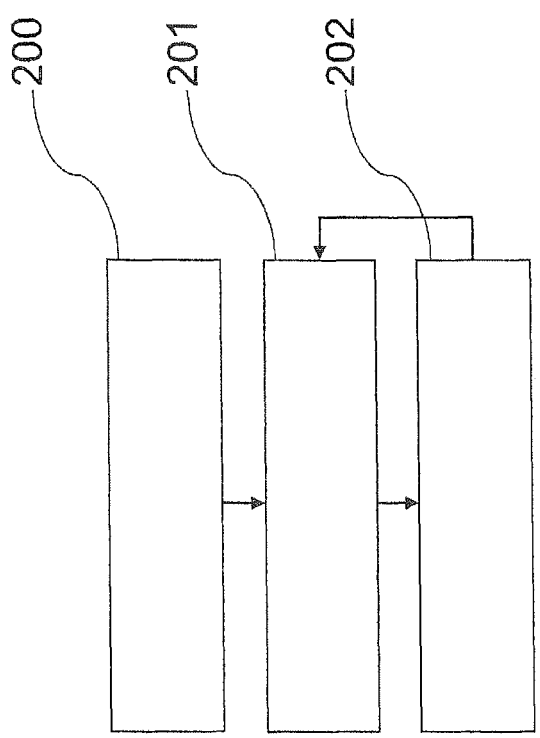
FIG. 5 shows a schematic illustration of a method for operating a computer cluster arrangement according to a further aspect of the present invention.

FIG. 5 shows a flow diagram illustrating a method for operating a computer cluster arrangement according to an aspect of the present invention. In the present embodiment after the assignment in step 202 of the at least one booster B to one of the plurality of computations nodes CN the step of computing 201 at least a second part of the computation task is performed. Hence, it is possible to select a specific booster B and based on the assignment being established in step 202 a booster B computes the at least second part of the computation task. This may be of advantage in case the at least second part of the computation task is forwarded to the resource manager RM, which assigns a booster B to the second part of the computation task. The resource manager RM can then transmit the second part of the computation task to the booster B, without the necessity that the computation node CN directly contacts the booster B.

Referring to FIGS. 4 and 5 the person skilled in the art appreciates that any of the steps can be performed iteratively, in a different order and may comprise further sub steps. For instance step 102 may be performed before step 101, which results in a computation of a first part of the computation task, an assignment of one booster to one computation node and finally computation of the second part of the computation task. Step 102 may comprise sub steps such as returning the computed at least second part of the computation task back to the computation node CN. Hence, the booster B returns the computed result back to the computation nodes CN. The computation nodes CN may use the returned value for computation of further computation tasks and may again forward at least a further part of a computation task to at least one of the boosters B.

Figure 6:
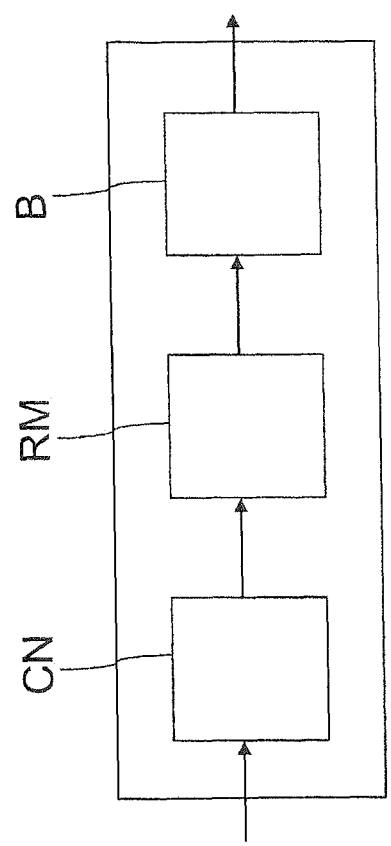
FIG. 6 shows a schematic illustration of control flow of a computer cluster arrangement according to a further aspect of the present invention.

FIG. 6 shows a block diagram of control flow of a computer cluster arrangement according to an aspect of the present invention. In the present embodiment a computation node CN receives a computation task and requests a booster B for outsourcing at least a part of the received computation task. Therefore, a resource manager RM is accessed, which forwards the part of the computation task to a selected booster B. The booster B computes the part of the computation task and returns a result, which is indicated by the most right arrow. According to a further aspect of the present embodiment the return value can be passed back to the computation node CN.

Figure 7:
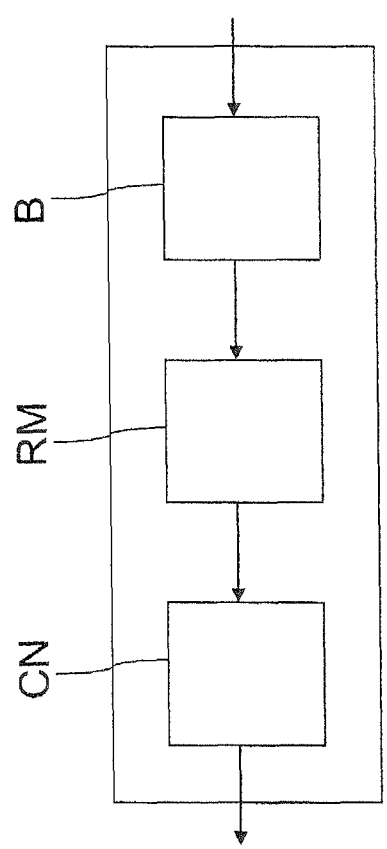
FIG. 7 shows a schematic illustration of control flow implementing reverse acceleration of a computer cluster arrangement according to a further aspect of the present invention.

FIG. 7 shows a block diagram of control flow, implementing reverse acceleration, of a computer cluster arrangement according to an aspect of the present invention. In the present embodiment an acceleration of computation of computation tasks being computed by at least one booster B is performed by assigning at least one computation node CN to at least one booster B. Hence the control and information flow is reversed as regards the embodiment being shown in FIG. 6. Computation of tasks can therefore be accelerated by outsourcing computation tasks from the boosters B to at least one computation node CN.

Figure 8:
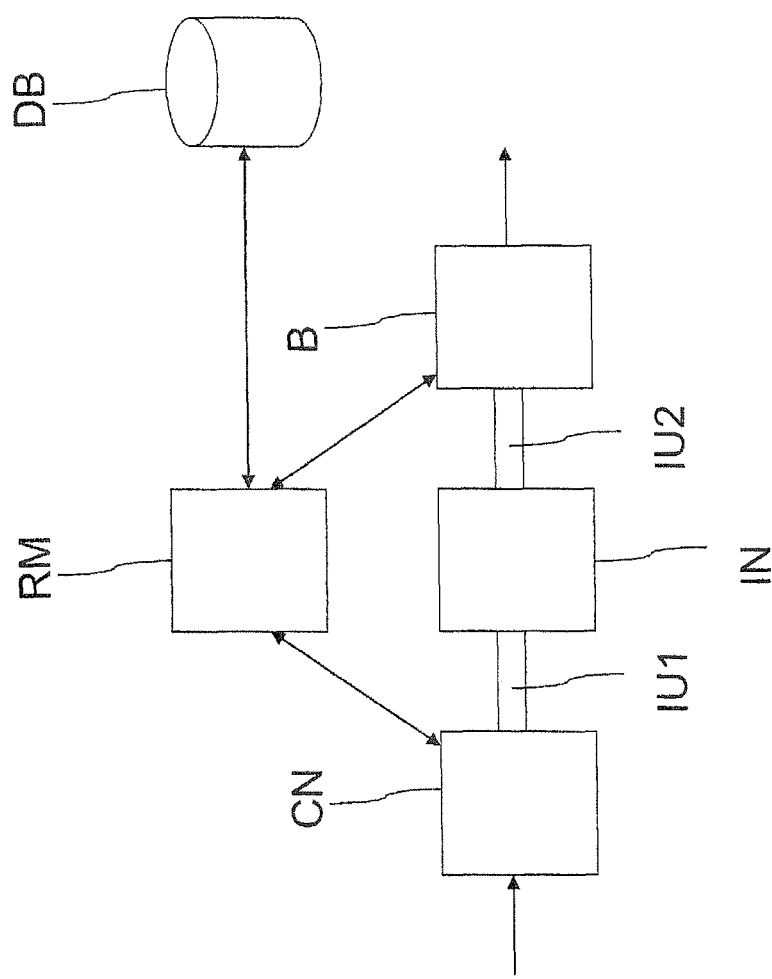
FIG. 8 shows a schematic illustration of control flow of a computer cluster arrangement according to a further aspect of the present invention.

FIG. 8 shows a block diagram of control flow of a computer cluster arrangement according to a further aspect of the present invention. In the present embodiment the resource manager RM does not pass the at least one part of the computation task to the booster B, but the computation node CN requests an address or a further identification of a booster B, which is arranged to compute the specific at least one part of the computation task. The resource manager RM returns the required address to the computation node CN. The computation node CN is now able to directly access the booster B by means of the communication infrastructure IN. In the present embodiment the communication infrastructure IN is accessed via interfacing units. The computation nodes CN accesses the communication infrastructure IN by interfacing unit IU1 and the booster B interfaces the communication infrastructure IN by interfacing unit IU2.

Furthermore, the resource manager RM is arranged to evaluate the resource capacities of the booster B and performs the assignment, which means the selection of the booster B, as a function of the evaluated resource capacities of each of the boosters B. For doing so the resource manager RM may access the assignment metric, which may be stored in a database DB or any kind of data source. The resource manager RM is arranged to update the assignment metric, which can be performed under usage of a database management system. The database DB can be implemented as any kind of storage. It may for instance be implemented as a table, a register or a cache.

Figure 9:
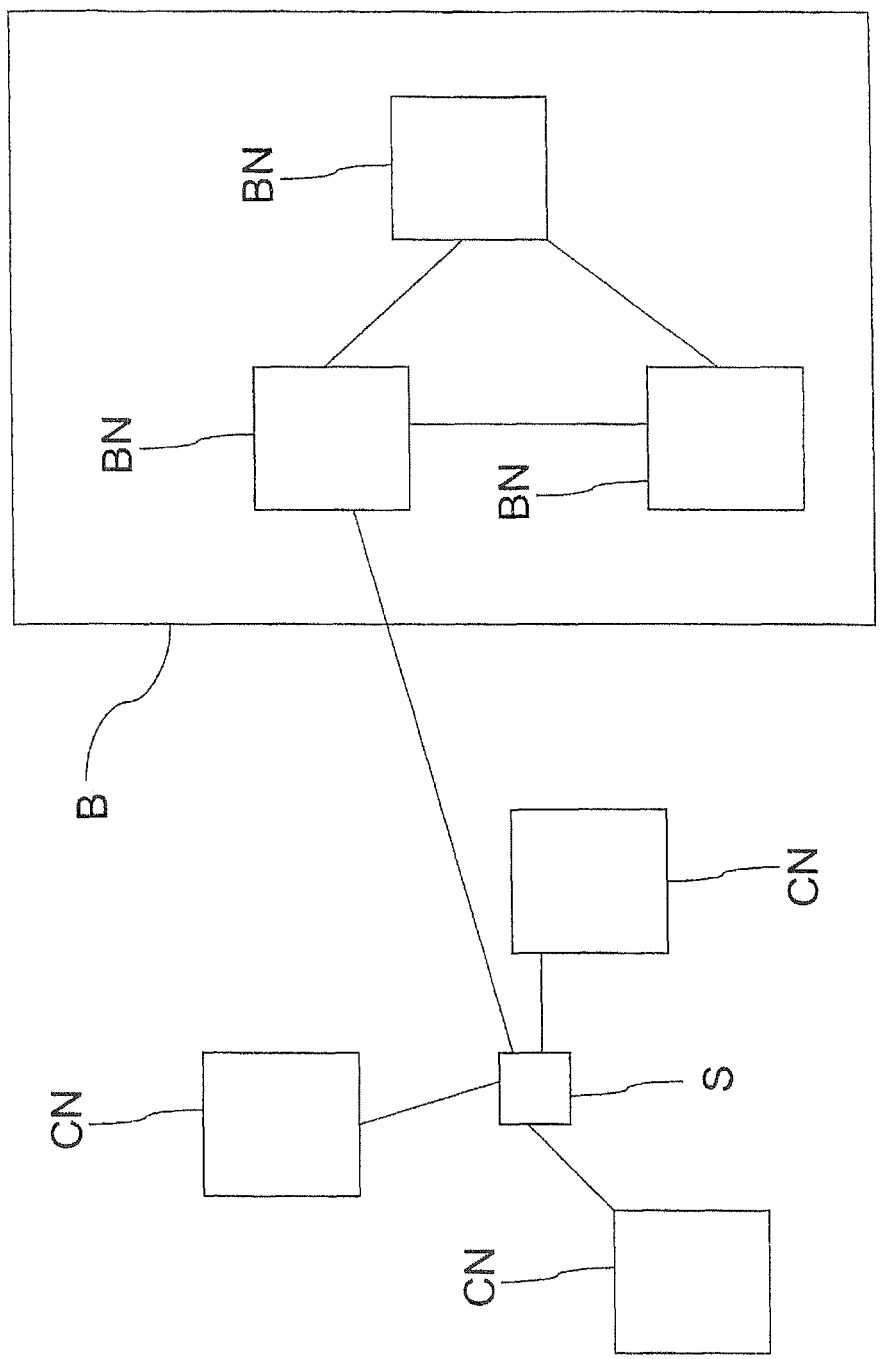
FIG. 9 shows a schematic illustration of network topology of a computer cluster arrangement according to an aspect of the present invention.

FIG. 9 shows a schematic illustration of network topology of a computer cluster arrangement according to an aspect of the present invention.

In one embodiment the computation nodes share a common, first, communication infrastructure, for instance a star topology with a central switching unit S. A further, second, communication infrastructure is provided for communication of the computation nodes CN with booster nodes BN. A third communication infrastructure is provided for communication among booster nodes BN. Hence, a high speed network interface for communication among booster nodes BN can be provided with a specific BN-BN communication interface. The BN-BN communication infrastructure can be implemented as a 3d topology.

In a further embodiment two communication infrastructures are provided, one for communication among computation nodes CN and one further communication infrastructure for communication among booster nodes BN. Both communication infrastructures can be coupled by at least one communication link from the first network to the second network or from the second network to the first network. Hence, one selected computation node CN or one selected booster node BN is connected with the respectively other network. In the present FIG. 9 one booster node BN is connected with the communication infrastructure of the computation nodes CN under usage of a switching unit S.

In a further embodiment the booster group BG itself may be connected to the communication infrastructure of the computation nodes CN or an intermediate communication infrastructure. The communication infrastructures may generally differ among other characteristics in their topology, bandwidth, communication protocols, throughput and message exchange. A booster B may for example comprise 1 to 10.000 booster nodes BN, but is not restricted to this range. The resource manager RM may generally manage parts of the booster nodes BN and can therefore partition the overall number of booster nodes BN and dynamically form boosters B out of said number of booster nodes BN. The switching unit S may be implemented by a switch, a router or any network device.

The person skilled in the art appreciates further arrangements of the components of the computer cluster arrangement. For instance the database DB may be accessed by further components, respectively nodes of the computer cluster arrangement. The illustrated computation nodes CN as well as the illustrated booster group BG may be one of many further computation nodes CN as well as one of many booster groups BG, respectively, which access the resource manager RM and/or the communication infrastructure IN. Furthermore acceleration can also be performed reversely by outsourcing at least a part of the computation task from at least one booster B to at least one computation node.

What is claimed is:

1. A computer cluster system for processing a computation task, comprising:
a plurality of hardware computation nodes, a plurality of hardware boosters, and a resource manager, the plurality of hardware computation nodes and the plurality of hardware boosters each interfacing a communication infrastructure;
the resource manager being arranged to assign a selected hardware booster of the plurality of hardware boosters to a first hardware computation node of the plurality of hardware computation nodes for computation of a part of the computation task, the resource manager also being arranged to assign, to the selected hardware booster, either of (i) the first hardware computation node or (ii) another hardware computation node of the plurality of hardware computation nodes to accelerate the computation of the part of the computation task being computed by the selected hardware booster, and wherein the resource manager is arranged to provide assignment information to the first hardware computation node after the assignment of the selected hardware booster so as to enable the first hardware computation node to output the part of the computation task to the assigned selected hardware booster under control of the first hardware computation node.

2. The computer cluster system according to claim 1, wherein the resource manager is arranged to perform said assignment of the selected hardware booster to the first hardware computation node as a function of a predetermined assignment metric, the assignment being static at a start of processing of the computation task and a dynamic assignment during processing of the computation task.

3. The computer cluster system according to claim 2, wherein the resource manager is arranged to perform the dynamic assignment in response to specific computation task characteristics.

4. The computer cluster system according to claim 2, wherein said predetermined assignment metric is formed according to at least one of a group of metric specification techniques, said group of metric specification techniques comprising: a temporal logic, an assignment matrix, an assignment table, a probability function, and a cost function.

5. The computer cluster system according to claim 2, wherein said predetermined assignment metric is specified as a function of at least one of a group of assignment parameters, said group of assignment parameters comprising: resource information, cost information, complexity information, scalability information, a computation log record, compiler information, priority information, and a time stamp.

6. The computer cluster system according to claim 2, wherein said resource manager is arranged to update said predetermined assignment metric during computation of said computation task.

7. The computer cluster system according to claim 1, wherein said assignment of the selected hardware booster to the first hardware computation node triggers at least one of a group of signals, said group of signals comprising: a remote procedure call, a parameter handover, and a data transmission.

8. The computer cluster system according to claim 1, wherein each hardware computation node of the plurality of hardware computation nodes and each hardware booster of the plurality of hardware boosters respectively interfaces said communication infrastructure via an interfacing unit.

9. The computer cluster system according to claim 8, wherein said interfacing unit comprises at least one of a group of components, said group of components comprising: a virtual interface, a stub, a socket, a network controller, and a network device.

10. The computer cluster system according to claim 1, wherein said communication infrastructure comprises at least one of a group of components, said group of components comprising: a bus, a communication link, a switching unit, a router, and a high speed network.

11. The computer cluster system according to claim 1, wherein each hardware computation node of the plurality of hardware computation nodes comprises at least one of a group of components, said group comprising: a multi-core processor, a cluster, a computer, a workstation, and a multi purpose processor.

12. The computer cluster system according to claim 1, wherein said selected hardware booster comprises at least one of a group of components, said group of components comprising: a many-core processor, a scalar processor, a co-processor, a graphical processing unit, a cluster of many-core processors, and a monolithic processor.

13. The computer cluster system according to claim 1, wherein the resource manager is arranged to detect computing capacities of the plurality of hardware boosters and computation task requirements of a hardware computation node of the plurality of hardware computation nodes, and to perform an assignment of a selected one or more hardware boosters of the plurality of hardware boosters to provide required capacities to the hardware computation node.

14. A method for operating a computer cluster arrangement for processing a computation task, comprising:
computing at least a first part of a computation task by at least two of a plurality of computation nodes, each computation node of the plurality of computation nodes interfacing a communication infrastructure;
assigning a selected booster of a plurality of boosters to a first computation node of the plurality of computation nodes by a resource manager, for computation of a second part of said computation task, said assignment being accomplished as a function of a predetermined assignment metric, wherein the resource manager provides assignment information to the first computation node after the assignment of the selected booster enabling the first computation node to output the second part of the computation task to the assigned selected booster under control of the first computation node; and
assigning at least one computation node of the plurality of computation nodes to said selected booster for accelerating the computation of said second part of said computation task.

15. The method of claim 14, wherein the first computation node is included in the at least one computation node.

* * * * *